US010188899B1

(12) United States Patent
Acuna, Jr.

(10) Patent No.: US 10,188,899 B1
(45) Date of Patent: Jan. 29, 2019

(54) DEADLIFT BAR APPARATUS AND METHOD

(71) Applicant: Roberto Acuna, Jr., Katy, TX (US)

(72) Inventor: Roberto Acuna, Jr., Katy, TX (US)

( * ) Notice: Subject to any disclaimer, the term of this patent is extended or adjusted under 35 U.S.C. 154(b) by 115 days.

(21) Appl. No.: 15/386,312

(22) Filed: Dec. 21, 2016

Related U.S. Application Data

(60) Provisional application No. 62/383,220, filed on Sep. 2, 2016.

(51) Int. Cl.
*A63B 21/00* (2006.01)
*A63B 23/04* (2006.01)
(Continued)

(52) U.S. Cl.
CPC .... *A63B 21/4035* (2015.10); *A63B 21/00061* (2013.01); *A63B 21/00065* (2013.01); *A63B 21/0724* (2013.01); *A63B 23/0405* (2013.01); *G09B 19/0038* (2013.01); *A63B 2023/0411* (2013.01)

(58) Field of Classification Search
CPC .......... A63B 21/0004; A63B 21/00058; A63B 21/00061; A63B 21/00065; A63B 21/00069; A63B 21/00076; A63B 21/00185; A63B 21/002; A63B 21/0023; A63B 21/02; A63B 21/04; A63B 21/0407; A63B 21/0414; A63B 21/0421; A63B 21/0428; A63B 21/0435; A63B 21/0442; A63B 21/055; A63B 21/0552; A63B 21/0555; A63B 21/0557; A63B 21/062; A63B 21/0626; A63B 21/0628; A63B 21/063; A63B 21/0632; A63B 21/065; A63B 21/068; A63B 21/072; A63B 21/0722; A63B 21/0724; A63B 21/0726; A63B 21/0728; A63B 21/075; A63B 21/4033; A63B 21/4035; A63B 21/4043; A63B 23/035; A63B 23/03516; A63B 23/03525; A63B 23/03575; A63B 23/04; A63B 23/0405; A63B 23/047; A63B 23/0482; A63B 2023/0411;
(Continued)

(56) References Cited

U.S. PATENT DOCUMENTS

| 3,207,511 | A | * | 9/1965 | Hoffman | ................ | A63B 17/00 482/104 |
| 3,751,031 | A | * | 8/1973 | Yamauchi | ............ | A63B 21/065 273/DIG. 19 |

(Continued)

*Primary Examiner* — Gary D Urbiel Goldner
(74) *Attorney, Agent, or Firm* — Rick B. Yeager

(57) ABSTRACT

A deadlift device includes a cylindrical shaft attached to a base, and one or more weights to be inserted onto the shaft. Horizontal channels in the shaft each have a main horizontal through hole with a downwardly extending keyhole slot extension with beveled edges, so that portions of one or more resistance bands may be routed through the keyhole slot extensions and used with minimal wear. A removable elongated lift bar which may be inserted into any of the channels. A removable handle with a grip may be secured to the top end of the shaft. A combination of the lift bar and the handle permit the deadlift device to be used effectively with a range of lift and walking exercises using the deadlift device with the one or more weights and/or the one or more resistance bands.

20 Claims, 19 Drawing Sheets

(51) Int. Cl.
*A63B 21/072* (2006.01)
*G09B 19/00* (2006.01)

(58) Field of Classification Search
CPC ........ A63B 2208/0204; A63B 2225/09; A63B 2225/093; A63B 2244/09
See application file for complete search history.

(56) References Cited

U.S. PATENT DOCUMENTS

| | | | | |
|---|---|---|---|---|
| 4,317,566 A * | 3/1982 | Uyeda | A63B 21/0628 | 482/139 |
| 4,371,162 A * | 2/1983 | Hartzell | A63B 21/04 | 482/123 |
| 4,377,281 A * | 3/1983 | Jesernig | A63B 21/4047 | 482/110 |
| 4,717,147 A * | 1/1988 | Rochelle | A63B 21/0724 | 294/15 |
| 4,984,786 A * | 1/1991 | Lemke | A63B 21/4001 | 482/105 |
| 5,029,849 A * | 7/1991 | Nurkowski | A63B 21/072 | 482/106 |
| 5,496,240 A * | 3/1996 | Damm | A63B 21/072 | 482/93 |
| 5,776,041 A * | 7/1998 | Fisher | A63B 21/0056 | 482/122 |
| 5,827,157 A * | 10/1998 | Lee | A63B 21/06 | 482/93 |
| 5,954,619 A * | 9/1999 | Petrone | A63B 71/0036 | 482/104 |
| D416,959 S * | 11/1999 | Tumminia | D21/662 | |
| 6,689,022 B1 * | 2/2004 | Emick | A63B 21/06 | 482/93 |
| 7,141,002 B2 * | 11/2006 | Connelly | A63B 21/072 | 482/50 |
| 7,815,553 B2 * | 10/2010 | Song | A63B 21/06 | 482/109 |
| 7,883,452 B1 * | 2/2011 | Chen | A63B 21/072 | 482/108 |
| D653,715 S * | 2/2012 | Tumminia | D21/662 | |
| 8,858,406 B2 * | 10/2014 | Klukas | A63B 15/00 | 482/108 |
| 9,498,676 B1 * | 11/2016 | Emick | A63B 23/04 | |
| 2004/0162199 A1 * | 8/2004 | Connelly | A63B 21/072 | 482/107 |
| 2012/0252641 A1 * | 10/2012 | Odneal | A63B 21/072 | 482/108 |
| 2014/0057764 A1 * | 2/2014 | Klukas | A63B 15/00 | 482/109 |
| 2015/0174445 A1 * | 6/2015 | Robertson, Jr. | A63B 23/0405 | 482/93 |
| 2015/0321044 A1 * | 11/2015 | English | A63B 21/072 | 248/415 |

* cited by examiner

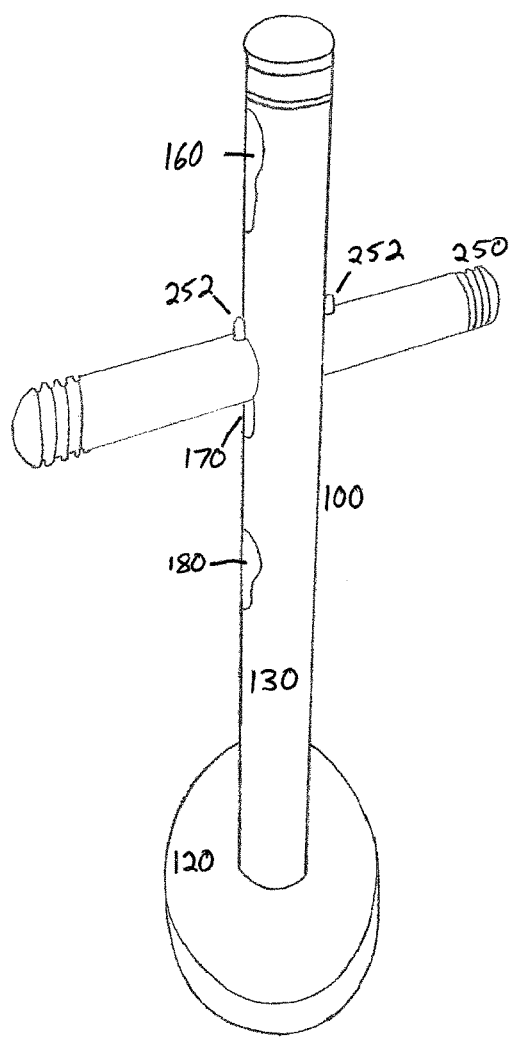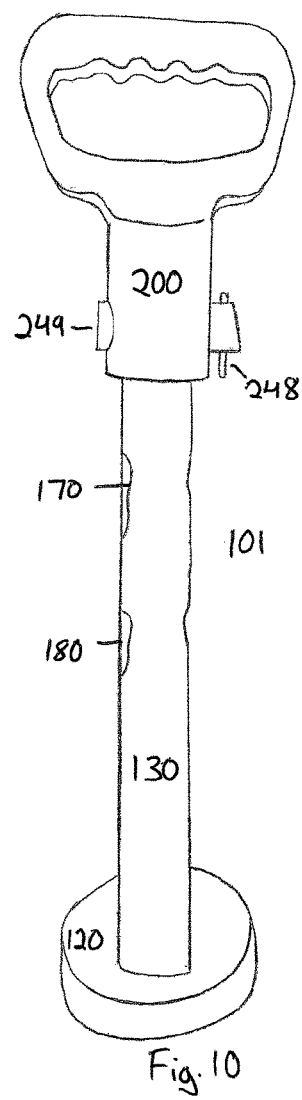
Fig. 9
Fig. 10

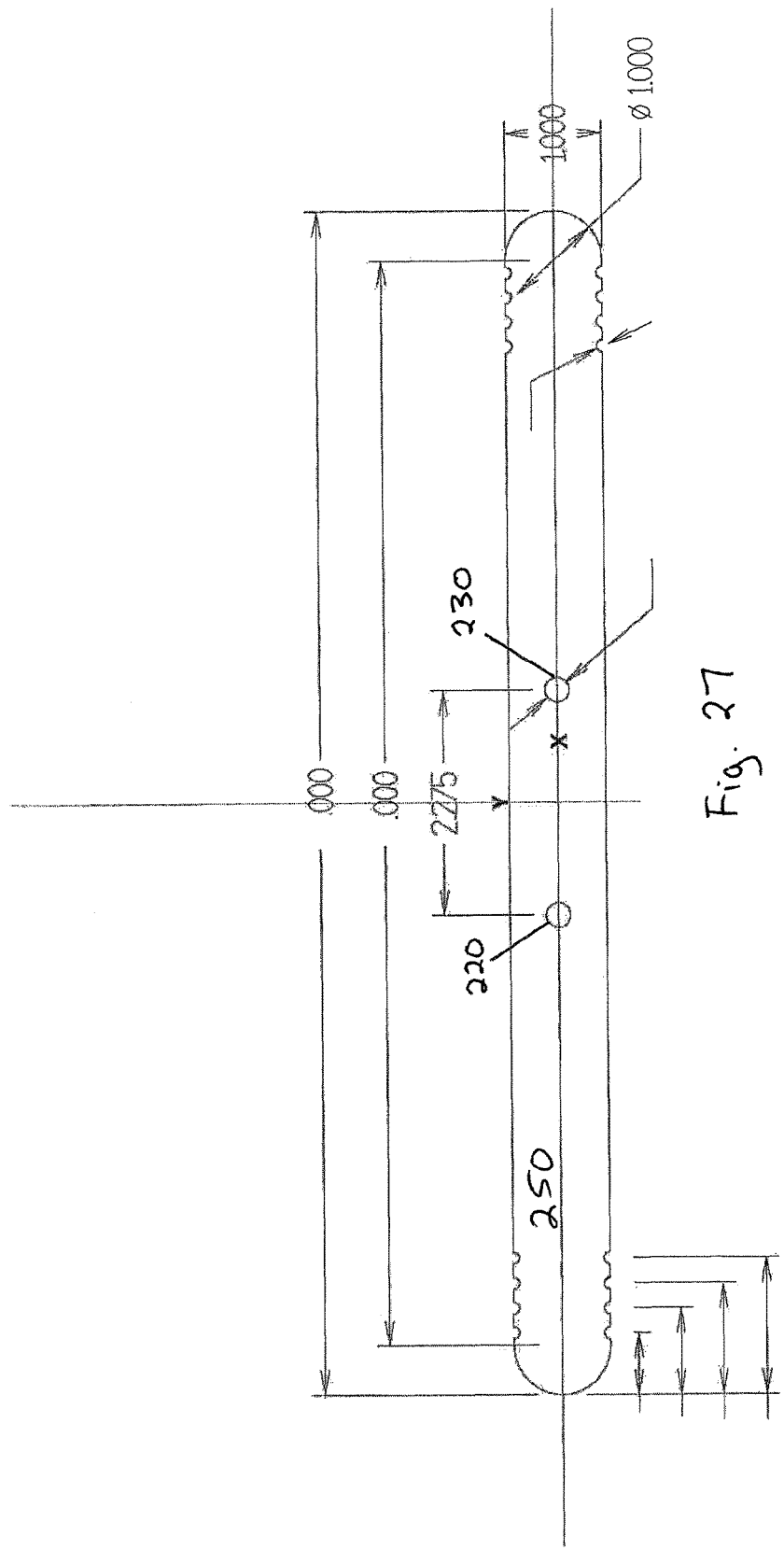

DEADLIFT BAR APPARATUS AND METHOD

RELATED APPLICATIONS

This U.S. non-provisional application is related to U.S. Provisional Application No. 62/383,220 filed by applicant on Sep. 2, 2016, and claims the benefit of that filing date.

BACKGROUND

Field of the Invention

The current invention relates to an improved weight lifting device, and more particularly to an improved deadlift device and method of use.

Prior Art

The deadlift is a key exercise in strength and conditioning programs. There are several deadlift variations, classifiable by the type of barbell used; and the technique used (sumo, conventional, stiff-legged, Romanian). The deadlift involves greater upper lumbar erector spinae muscle activity, but less lower lumbar erector spinae muscle activity than the back squat. It involves similar abdominal muscle activity to the back squat, side plank and superman exercises. Deadlifts work the butt, upper thighs, hamstrings, lower back, upper middle back, traps, and gives a kind of "fullness" in the chest. The deadlift is in fact considered by many fitness professionals to be the king of exercises for expending great amounts of energy and wasting calories.

The deadlift is considered to have many benefits:
1. Fat Burning Lift: Lifting weights and resistance training, especially with a full body exercise like deadlifting, will burn more fat than just dieting or dieting with cardio exercise alone.
2. Works The Most Muscles In The Body: The Deadlift works more muscles than any other exercise, including the squat. The lift engages all of the major muscle groups. The Deadlift works your lower and upper body, including your back muscles.
3. Real Life Lift: The Deadlift develops the muscles you need to actually carry something in real life situations; whether on the playing field, or in everyday life.
4. It's Safe: When performed with good form, the deadlift is one of the safest weightlifting exercises.
5. Increased Cardio: The deadlift increases cardiovascular ability, due to all of the muscles involved in performing the lift.
6. Improves Posture: Deadlifting increases your core strength and adds to core stability, according to Robson. Deadlifting targets all of the muscles responsible for your posture and enables you to keep your back straighter during regular daily activities.
7. Increases/Improves Athletic Performance: Every athlete can improve at almost every dimension of their sport by including deadlifting into their workout regime.
8. Great Lift for Pregnant Women: It has been scientifically proven that women can deliver a baby easier by having control of the creation of intraabdominal pressure, a strong pelvic floor, and can survive the rigours of delivery with fewer soft tissue injuries; by having a strong deadlift prior to third trimester.
10. Great For People With Back Injuries and/or Preventing Back Injuries: The ability to develop strength and stability through the lumbar spinal muscles is one of the primary factors in preventing lumbar discogenic issues, as it helps buffer shear forces the disc is exposed to; which if left unchecked could result in a bulge, herniation, or even spondylolisthesis. Deadlifts build the strength and stability of lumbar spinal muscles.
11. Prevents Many Other Injuries: When performed properly/correctly, The Deadlift can help prevent injuries by increasing the strength of your muscles around critical tendons and ligaments. Supporting joints with strong muscles is crucial to preventing injury, especially in the hamstrings and lower back.
12. Great For Sculpting The Body: Great glutes and legs can be built by deadlifting. The deadlift is an excellent glute, hamstring, and quad builder exercise. It not only sculpts the lower body, but also sculpts the core, back, arms, shoulders, and traps as well.

A deadlift, whether it is sumo style, conventional style, or Romanian style, is hard to perform with proper form. This lift can cause the user serious injury if not performed properly, due to all the steps needed to ensure the lift is done correctly.

Using a straight barbell to perform the deadlift can be too big and heavy for new lifters. Also, when using a straight barbell correctly for the deadlift; it can result in scraping the skin off the shins and thighs of the lifters.

Prior art patents and published applications show a variety of resistance training devices:

U.S. Pat. D653,715 to Tumminia (FIG. 1) shows a kettlebell.

U.S. Pat. No. 4,717,147 to Rochelle (FIG. 2) describes a weight lifting device which utilizes a post having a flange fixed to one end of the post to form a base. The post and flange retain disc shaped weights commonly used in weight lifting equipment. A bar is also employed as a gripping mechanism and is rotatable in relation to the post and attached flange.

U.S. Pat. No. 5,496,240 to Damm (FIG. 3) describes a hand held type arm exercise device wherein the device is arranged to extend an individual's arms permitting raising and lowering of a stack of weights or single weight thereof mounted about a central rod, said central rod includes a pivot axle, and the pivot axle includes a plurality of handle rods, such that pivoting of the handle rods from a first position substantially aligned with the central shaft to a second position substantially obliquely oriented to the central rod effects vertical movement of the central rod and the weights.

U.S. Pat. No. 5,827,157 to Lee (FIG. 4) describes an arm muscle exerciser includes a main stand, a base plate, two handles and several weight discs; the upper part of the main stand is a smaller diameter section with a smaller outer diameter; the base plate is joined to the bottom of the main stand; each end of the two handles has an end pivotally attached to a respective one of a pair of parallel pivot axles on opposite sides of the upper part of the main stand such that they pivot symmetrically in a plane; in the weight disc is an accommodating hole; at one side of the accommodating hole is an opening; the smaller diameter section of the main stand may be inserted into the accommodating hole through the opening, and slide down along the outer diameter of the main stand to fall onto the base plate, so the base plate will support an appropriate number of weight discs. This construction achieves such functions as to train arm muscles, to enable simplified configuration, easy assembling process, lower production costs, convenient operational procedures, adjustable weights, and better training efficiency, et U.S. Pat. No. 7,141,002 to Connelly (FIG. 5) describes a weightlifting apparatus with a bar having a first and a second opposing end. A weight having a central aperture is dimensioned so that the bar can be passed through the aperture. The bar has an end cap having an outer dimension larger than that of the bar and the aperture, with the end cap being situated adjacent the first end of the bar. A clamp secures the weight to the bar adjacent the end cap. An aperture through the bar adjacent the second end of the bar is provided for either pivotal or direct attachment of the gripping plate. The gripping plate may be round, elliptical, continuously variable diameter, or irregular or other shapes. The gripping plate may be firm and flexible and have weights built into the plate itself.

U.S. Pat. No. 7,815,553 to Song (FIG. 6) describes a multi-functional health machine which can improve a fixing power of a weight unit in the health machine which can temper various kinds of muscles such as muscles of the upper body and muscles of the waist and the legs, which prevents a connection portion of a support rod which can be selected according to user's physique from seceding due to rotation of a handle portion, and which can reduce a load which is applied to the wrist by making the handle portion rotate according to rotation of the hands to thus make a weight portion placed in a straight line according to the gravitational force of the weight portion. The multi-functional health machine includes: a handle portion on the outer sides of which a pair of grasping rods which a user can hold are respectively formed; a fixing portion to both sides of which the handle portion is fixed; a support rod portion on the upper end of a support rod of which the center of the fixing portion is fixed perpendicularly with the handle portion fixed to the fixing portion; and a weight portion in which a plumbing plate of a weight plumb is formed at the lower end of the support rod of the support rod portion.

US Patent Application Publication No. 2015/017445 (FIG. 7) to Robertson describes an adjustable exercise device includes a removable handle, a extendible stacking pole and a base. The handle can be any of a number of shapes for ergonomic control. The stacking pole is designed to hold typical round weightlifting discs in a stack on the base, which is attached to the bottom of the stacking pole to both restrain the weights and serve as a platform base for the floor. The stacking pole is adjustable in length. The handle can be removed from the stacking pole by pulling a pin, thereby releasing the handle.

The prior art also shows a variety of resistance band exercises and devices.

U.S. Pat. No. 5,776,041 (FIG. 8) to Fisher describes a multipurpose exercise device includes a stiff bar terminating in limb engagement members and a flexible element connected to the center of the bar, extending away from the bar and being provided with its own limb engagement members. The bar can be positioned so that it engages the feet and the flexible member can be positioned to engage the hands or vice versa to perform a large array of exercises. Preferably the flexible member is elastic.

There does not appear to be any deadlift device on the market, so most users attempt the lifts and other exercises with a straight barbell as shown in prior art FIGS. 21 and 24.

SUMMARY

In one embodiment, an improved deadlift device includes a cylindrical shaft having a lower end threaded onto a base. The cylindrical shaft is configured to accept one or more weights to be inserted onto the shaft and resting on the base. The cylindrical shaft has a plurality of horizontal channels, where each channel has a main horizontal through hole with a downwardly extending keyhole slot extension. Both the main holes and the keyhole slots have beveled edges so that portions of one or more resistance bands may be routed through the keyhole slots and used with minimal wear. The main holes have a slightly larger diameter than the diameter of a removable elongated bar which may be inserted into any of the channels.

In another example, a removable handle with a grip may be secured to the top end of the shaft. The combination of a lift bar and a handle permit the deadlift device to be used effectively with a range of lift and walking exercises using the deadlift device with added weights and/or one or more resistance bands.

BRIEF DESCRIPTION OF THE DRAWINGS

FIG. 9 is a front perspective view of a deadlift device with a lift bar.

FIG. 10 is a front perspective view of a deadlift device with a handle.

FIG. 27 is a side view of an example lift bar.

DETAILED DESCRIPTION

Figure 2:
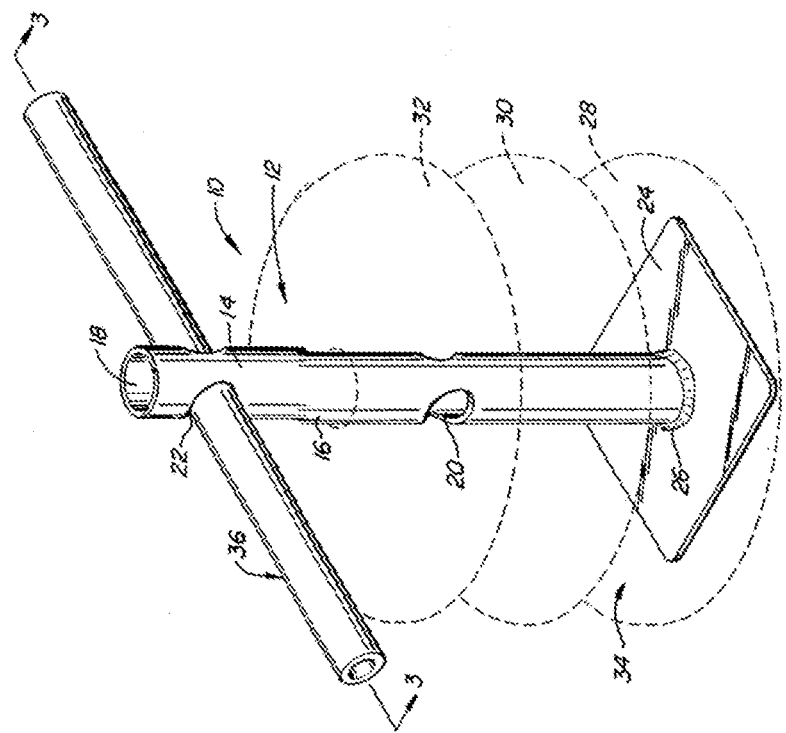
FIG. 2 (PRIOR ART) shows a device of U.S. Pat. No. 4,717,147.
Figure 1:
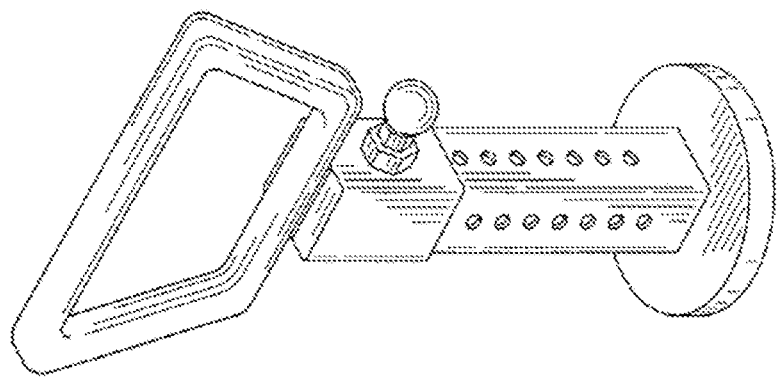
FIG. 1 (PRIOR ART) shows a device of U.S. Pat. D653,715.
Figure 3:
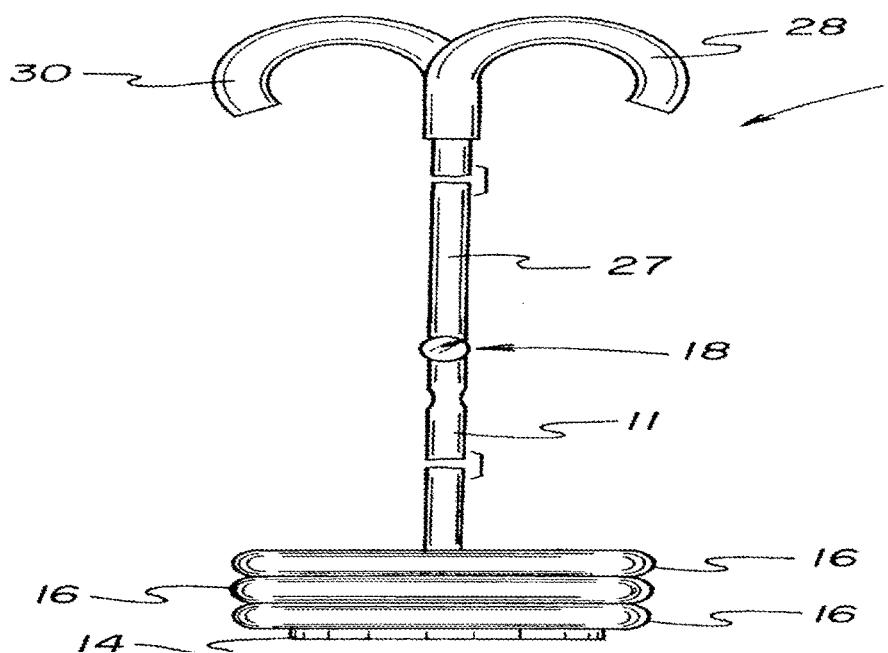
FIG. 3 (PRIOR ART) shows a device of U.S. Pat. No. 5,496,240.
Figure 4:
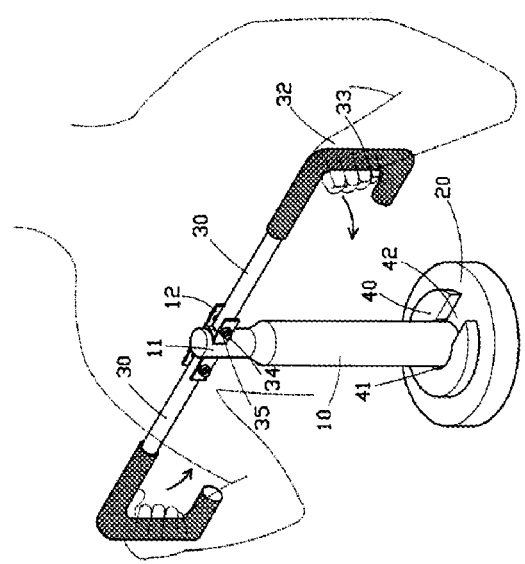
FIG. 4 (PRIOR ART) shows a device of U.S. Pat. No. 5,827,157.
Figure 5:
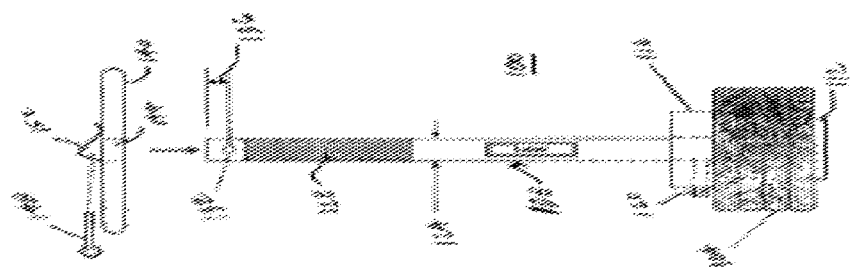
FIG. 5 (PRIOR ART) shows a device of U.S. Pat. No. 7,141,002.
Figure 8:
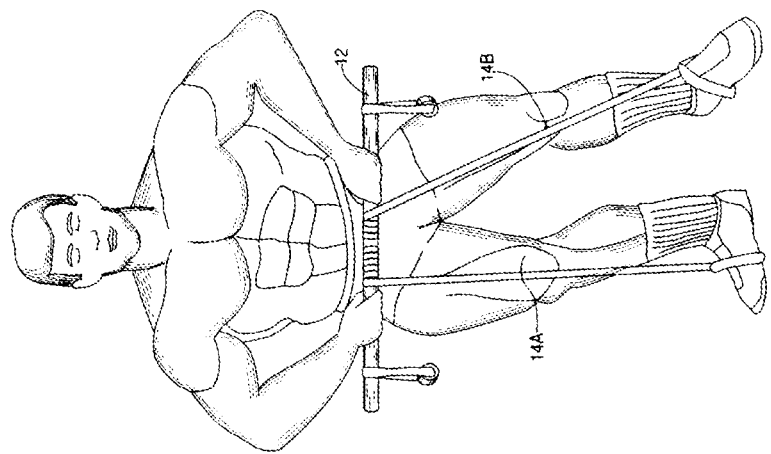
FIG. 8 (PRIOR ART) shows a device of U.S. Pat. No. 5,776,041.
Figure 7:
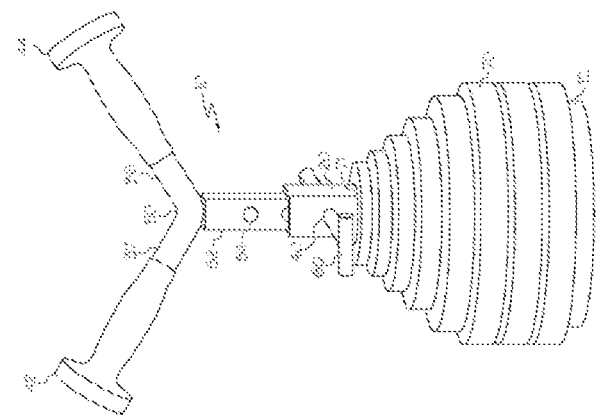
FIG. 7 (PRIOR ART) shows a device of US Patent Application Publication No. 2015/017445.)
Figure 6:
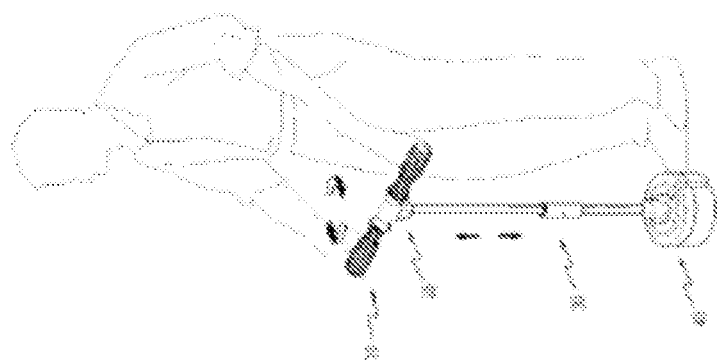
FIG. 6 (PRIOR ART) shows a device of U.S. Pat. No. 7,815,553.

The following element list is provided for convenience in reviewing the figures:
user 50
   head 51
   shoulders 52, 53
   back 54
     spine 56
   arms 58, 59
   feet 70, 71
Weights 60, 61, 62,
Deadlift device 100, 101, 102
Base 120
   floor protector 122
   central recess 123
     shaft attachment threads 124
   shaft weld 126 (not shown)
main shaft 130
   external diameter 132
   top portion of shaft 140
     top of shaft 142
       rounded top 144
   bottom portion of shaft 150
     bottom of shaft 152
     base attachment threads 154
       overlapping thread lip locking element 156
     rubber pad 158
   first channel 160
     bottom portion of hole 161
     main through-hole 162
       beveled edge 163
     keyway slot 164
       beveled edge 165
   second channel 170
     bottom portion of hole 171
     main through-hole 172
       beveled edge 173
     keyway slot 174
       beveled edge 175
   third channel 180
     bottom portion of hole 181
     main through-hole 182
       beveled edge 183
     keyway slot 184
       beveled edge 185
Handle 200
   handle opening 210
     grip portion 212
   handle attachment sleeve 240
     shaft mounting recess 242
     first side hole 244
     second side hole 246
     sleeve locking element 249
       sleeve locking pin 248
Lift Bar 250
   first shaft mounting pin hole 220
     pin 222
   second shaft mounting pin hole 230
     pin 232
resistance band 300
resistance band 310

FIG. 9 is a front perspective view of a deadlift device 100 with a lift bar 250. In this example, a vertical main shaft 130 has a lower end threaded into base 120. The main shaft has three channels 160, 170, and 180 which may be used to insert the lift bar 250, or resistance bands (not shown). The lift bar is held in place by two lock pins 222 and 232 positioned on either side of the vertical shaft. In this example, the lift bar is inserted through a selected channel with the lock pins facing down into the keyhole slot. Once centered, the lift bar is rotated so that the pins are upright.

FIG. 10 is a front perspective view of a deadlift device 101 with a handle 200. In this example, the vertical main shaft 130 has a lower end threaded into base 120. The main shaft has three channels. The top channel 160 (not labeled) is used to secure the handle, and the lower two channels 170 and 180 may be used to insert resistance bands. The handle is held in place by a sleeve locking element 249 and sleeve locking pin 248.

Figure 11:
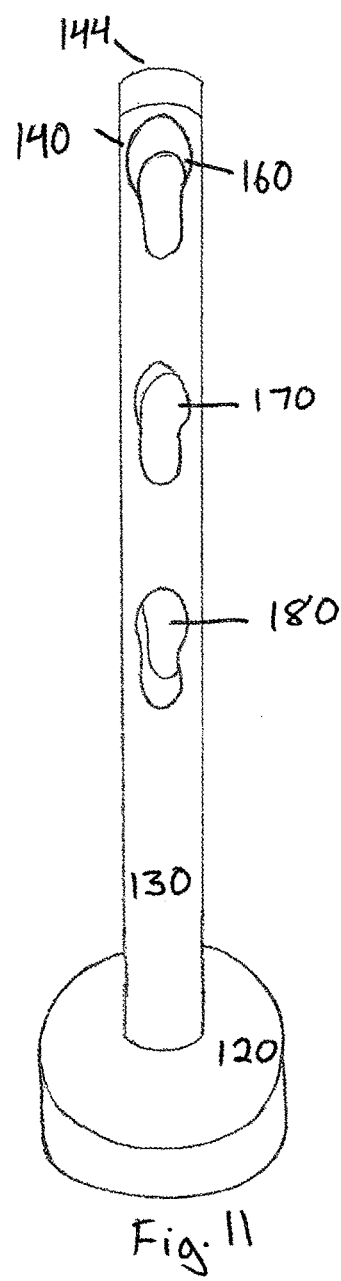
FIG. 11 is a side perspective view of a deadlift device with no attached lift bar or handle.

FIG. 11 is a side perspective view of a deadlift device 100 with no attached lift bar or handle. The top portion 140 of the shaft includes a rounded top 144.

Figure 12:
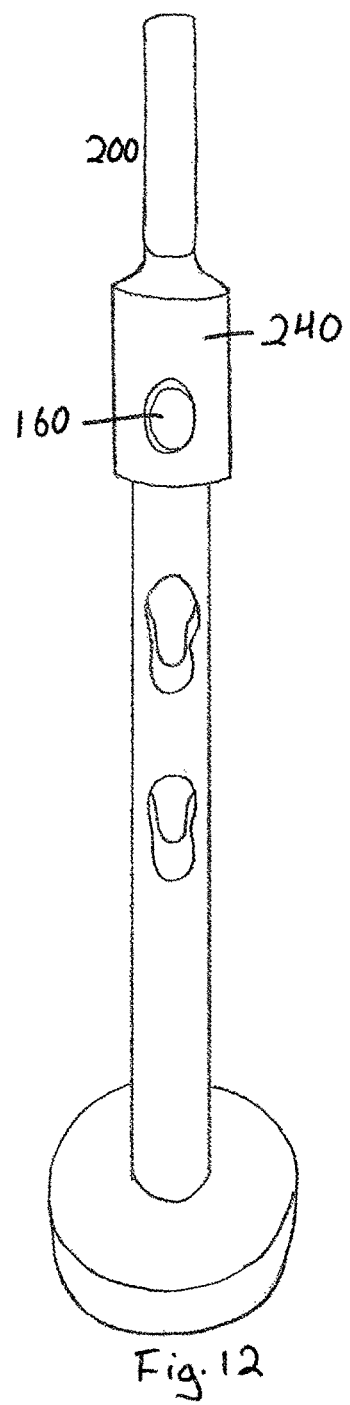
FIG. 12 is a side perspective view of the deadlift device with a handle placed on the shaft.

FIG. 12 is a side perspective view of the deadlift device 100 with a handle 200 placed on shaft 130. The sleeve locking element 249 has not yet been inserted in the top channel 160.

Figure 13:
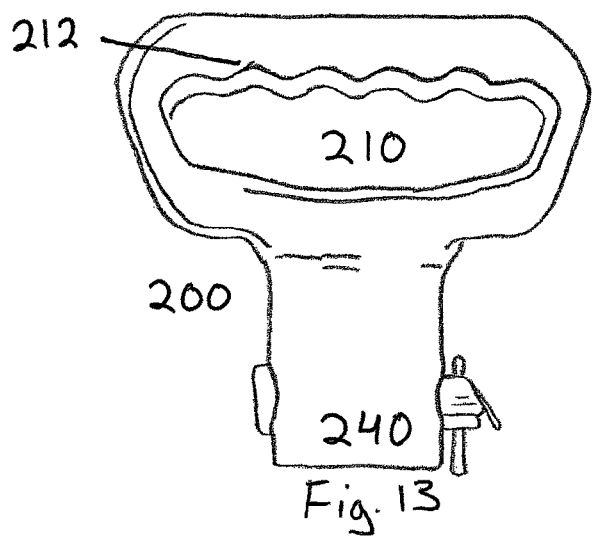
FIG. 13 is a front view of an example handle showing a handle attachment sleeve, and a handle opening with grip portion.

FIG. 13 is a front view of an example handle 200 showing a handle attachment sleeve 240, a handle opening 210 with grip portion 212.

Figure 14:
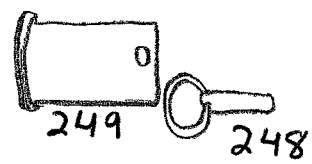
FIG. 14 is a top perspective view of a sleeve locking element and a sleeve locking pin.

FIG. 14 is a top perspective view of a sleeve locking element 249 and a sleeve locking pin 248. In this example, the sleeve locking element is a large pin having a head and a shaft diameter slightly less than the diameter of the top main through-hole 162 (FIG. 15).

Figure 15:
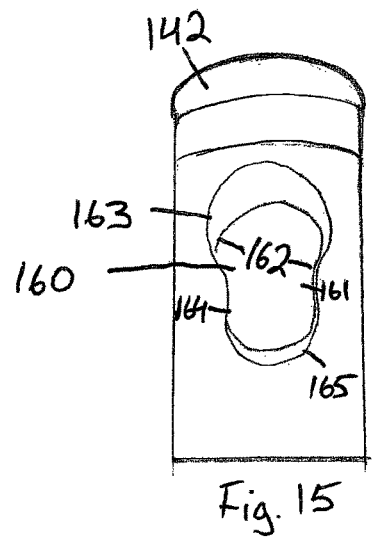
FIG. 15 is a side view of the top portion of a shaft showing the top of the shaft and the top hole

FIG. 15 is a side view of the top portion of a shaft showing the top of the shaft 142, and the top hole 160. In this example, the top hole has a main through-hole 162 with a keyway slot 164 positioned on the bottom 161 of the main through-hole. The main through-hole 162 has a beveled edge 163, and the keyway slot 164 has a beveled edge 163. The beveled edges reduce stresses on optional resistance bands as discussed below.

Figure 16:
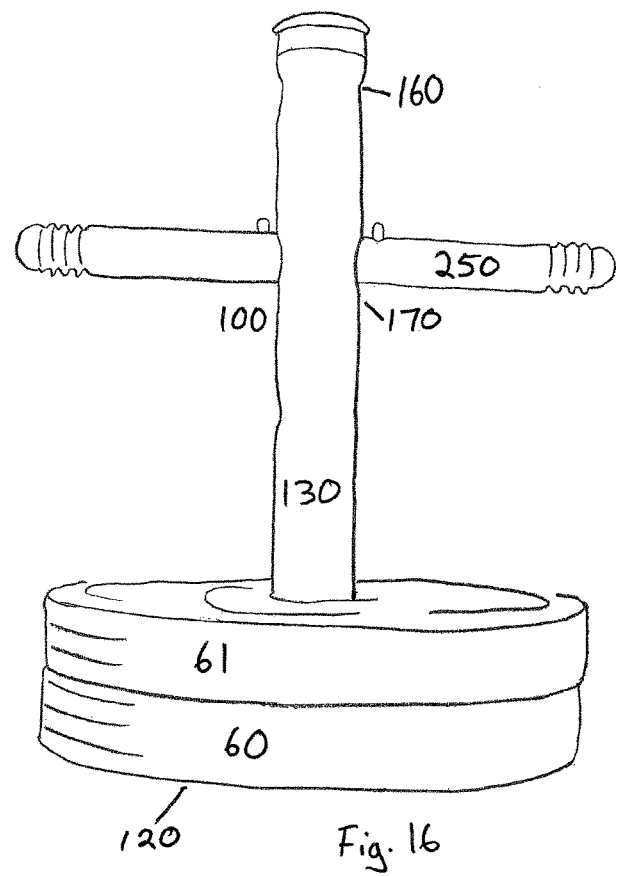
FIG. 16 is a front view of a deadlift device with weights stacked on the base and a lift bar inserted through the second hole in the shaft.

FIG. 16 is a front view of a deadlift device 100 with weights 60 and 61 stacked on base 120, and lift bar 250 inserted through the second channel 170 in the shaft 130.

Figure 17:
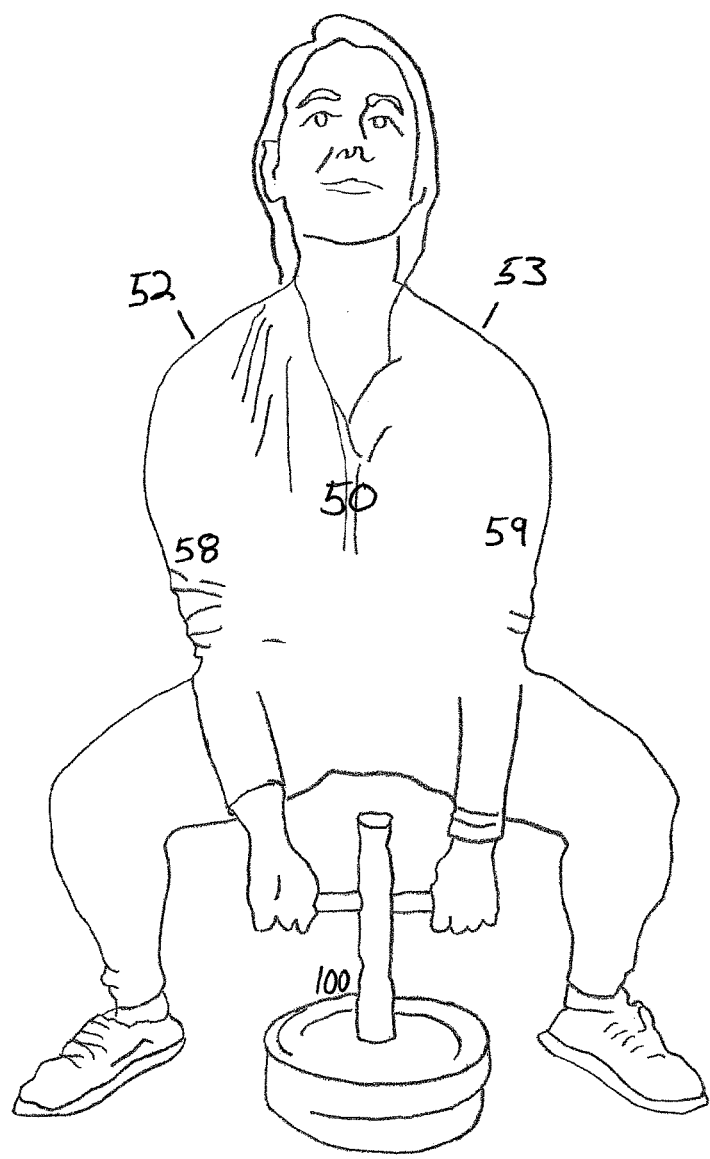
FIG. 17 is a front view of a user in proper position to perform a lift with deadlift device with weights.

FIG. 17 is a front view of a user 50 in proper position to perform a lift with deadlift device 100 with weights 60 and 61. In this position, the user maintains a straight back and positions shoulders 52 and 53, and arms 58 and 59, directly over the lift bar 250.

Figure 18:
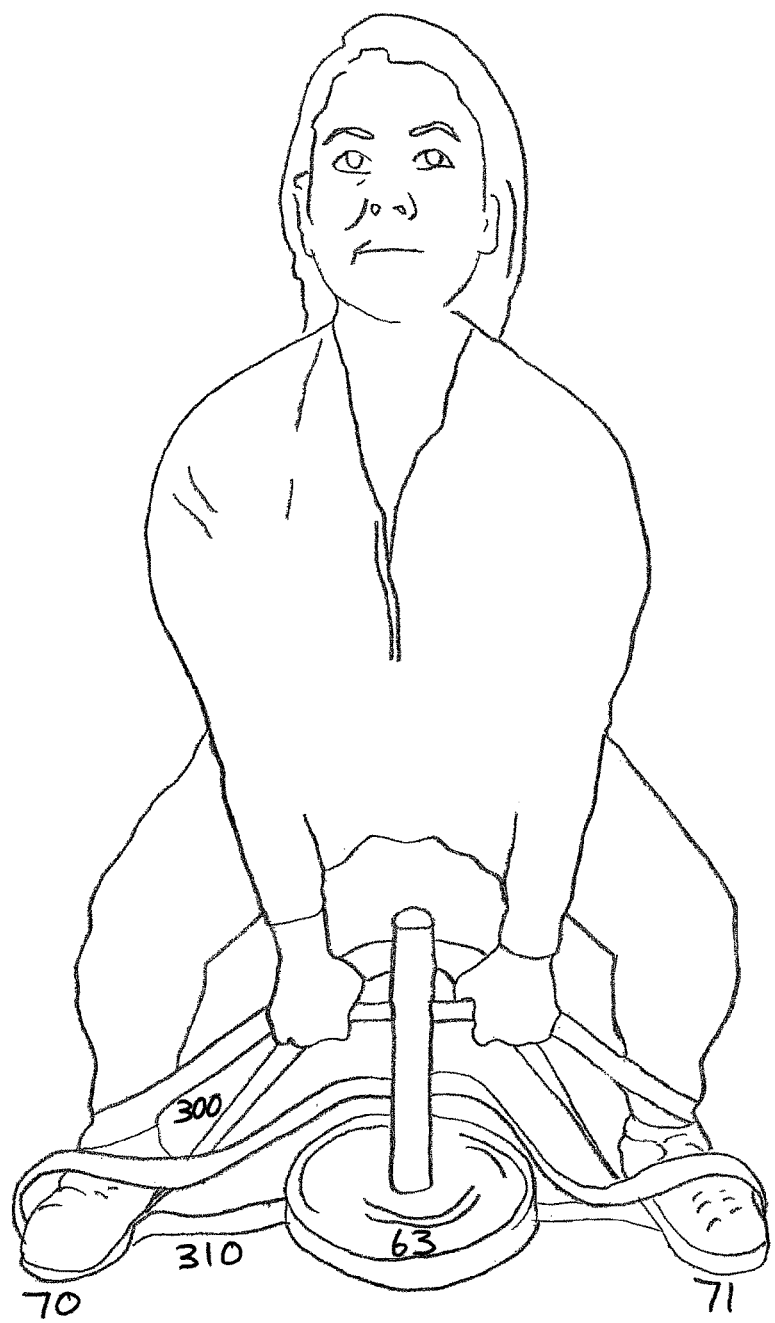
FIG. 18 is a front view of a user in proper position to perform a lift with deadlift device with weight and two resistance bands.

FIG. 18 is a front view of a user 50 in proper position to perform a lift with deadlift device 100 with weight 63 and two resistance bands. In this example, a first resistance band loop 300 is pushed through the top channel 160 in the deadlift device 100, and ends of the loop are held by the user's feet 70 and 71. A second resistance band loop 310 is pushed through the bottom hole 180 in the deadlift device 100, and ends of the loop are held by the user's feet 70 and 71.

Figure 19:
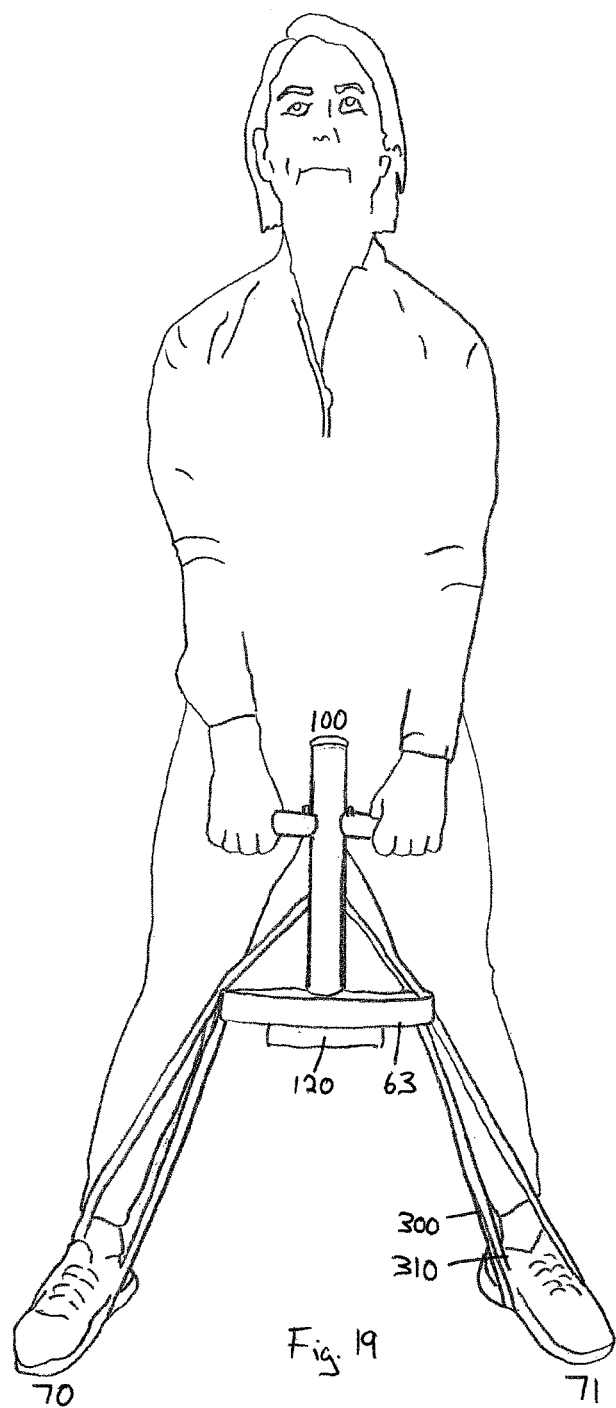
FIG. 19 is a front view of a user completing a lift with deadlift device with weight 63 and two resistance bands.

FIG. 19 is a front view of a user 50 completing a lift with deadlift device 100 with weight 63 and two resistance bands. In this example, both resistance bands 300 and 310 are directed through the bottom channel 180 in the device shaft.

Figures 20, 21:
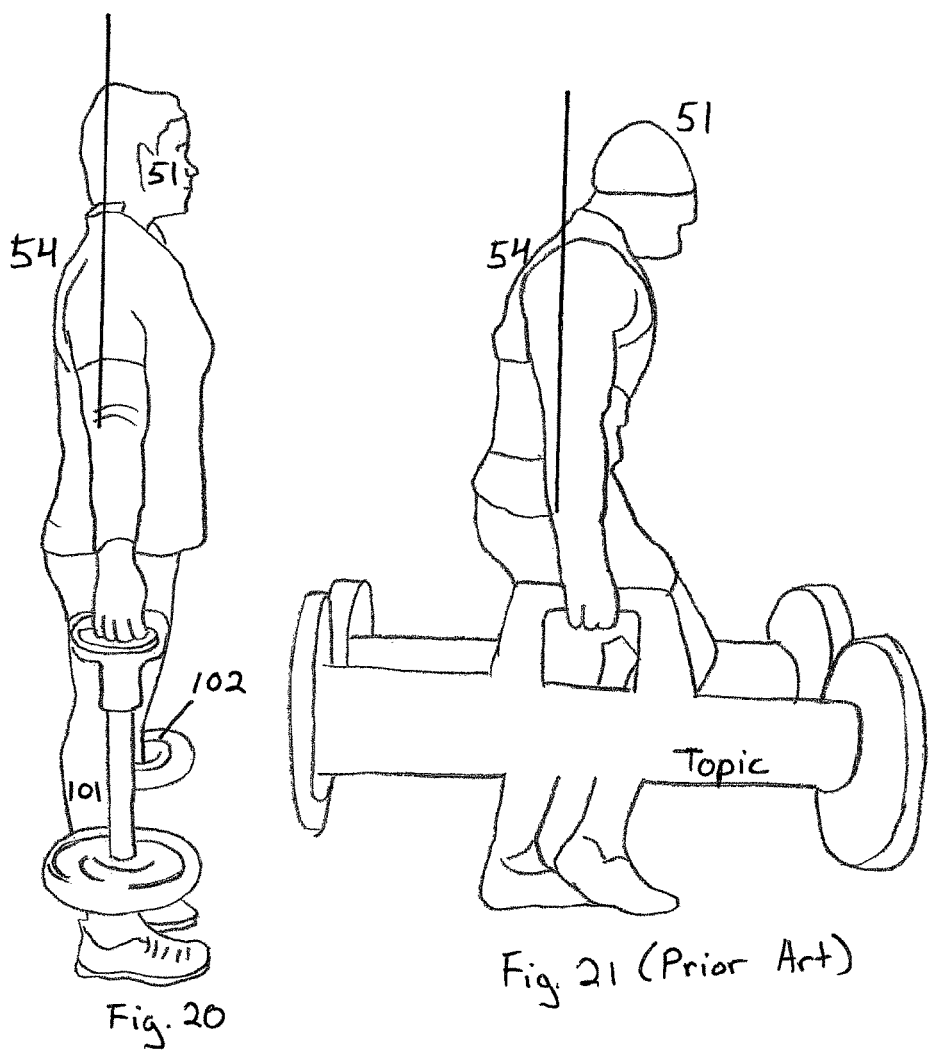
FIG. 20 is a side view of a user beginning a walking exercise with a pair of deadlift devices.
FIG. 21 (PRIOR ART) is a side view of a prior art user beginning a walking exercise with a pair of long prior art devices.

FIG. 20 is a side view of a user 50 beginning a walking exercise with a pair of deadlift devices 101 and 102. The user is able to maintain a straight back 54 and head 51.

FIG. 21 (PRIOR ART) is a side view of a prior art user beginning a walking exercise with a pair of long prior art devices. The extended length of the prior art devices causes the user's head 51 to push forward and back 54 to bend. Prior to the deadlift device, the only way to deadlift weight off the ground was to use a straight barbell. Since using a straight barbell is sometimes difficult to use for lifters of smaller stature, this invention allows for lifters of all shapes, ages, and sizes to use and allows the lifter to perform the deadlift properly.

Figure 22:
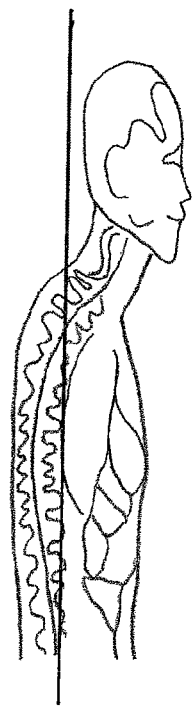
FIG. 22 (PRIOR ART) shows stressful curvature on the spine 56 when the head is forward and the back is bent as in FIG. 21.

FIG. 22 (PRIOR ART) shows stressful curvature on the spine 56 when the head is forward and the back is bent as in FIG. 21.

The deadlift devices permit the user to maintain an erect posture during this walking exercise. By contrast FIG. 21 (PRIOR ART) shows a user attempting to use handles on traditional long barbells. In this example the user does not maintain proper posture, and has a head-forward position causing stress on his bent spine.

Figure 23:
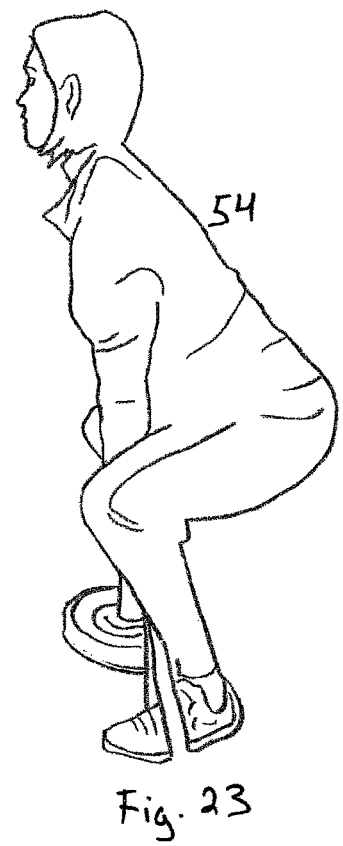
FIG. 23 is a side view of a user maintaining a straight back while beginning a lift exercise with a deadlift device with weight and resistance band.

FIG. 23 is a side view of a user maintaining a straight back 54 while beginning a lift exercise with a deadlift device with weight and resistance band.

Figure 24:
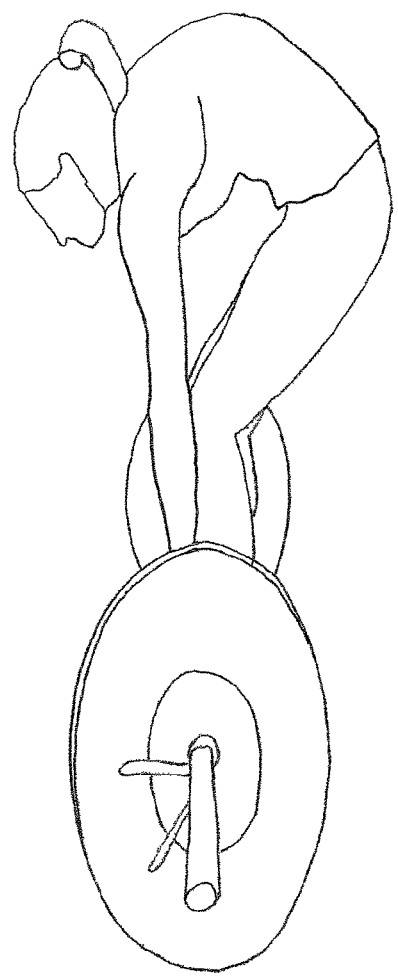
FIG. 24 (PRIOR ART) shows stressful curvature on the back of a user with a prior art barbell and weight.

FIG. 24 (PRIOR ART) shows stressful curvature on the back 54 of a user with a prior art barbell and weight. Many lifters do not perform the deadlift properly because they don't want to scrape their shins and thighs, resulting in poor form; thus resulting in injury. Also, using a straight barbell can be intimidating and sometimes is too heavy and bulky for new lifters.

Figures 25A, 25B:
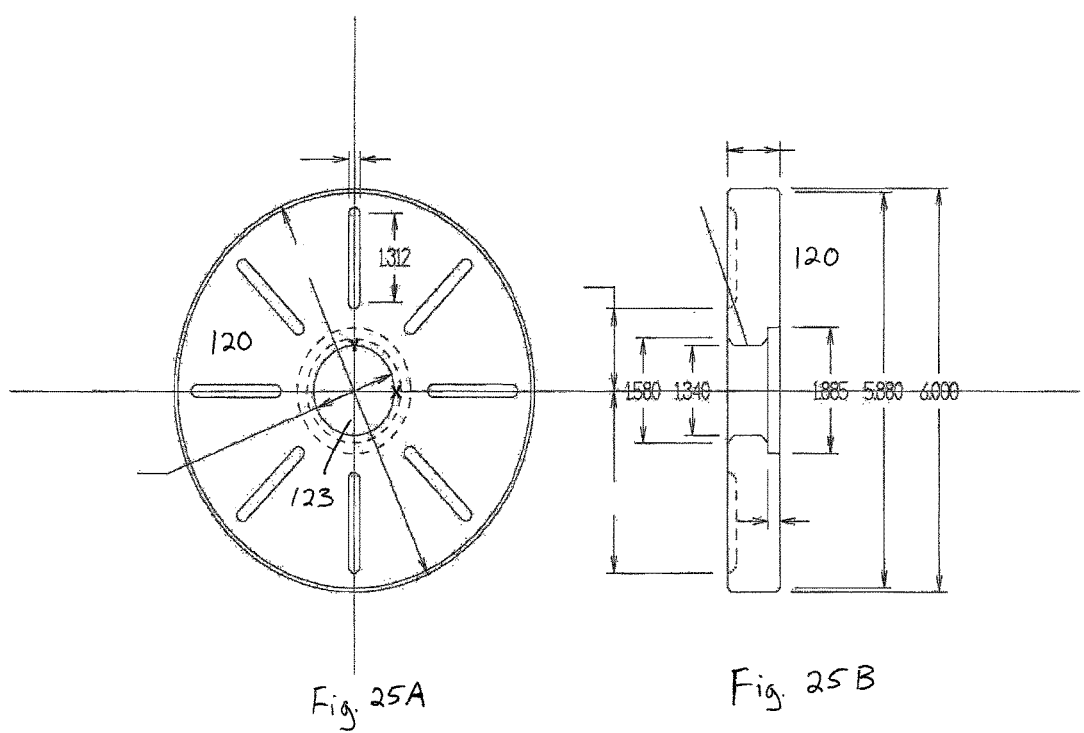
FIG. 25A is a top view of an example base.
FIG. 25B is a cross section view of the example base of FIG. 25A
Figure 26:
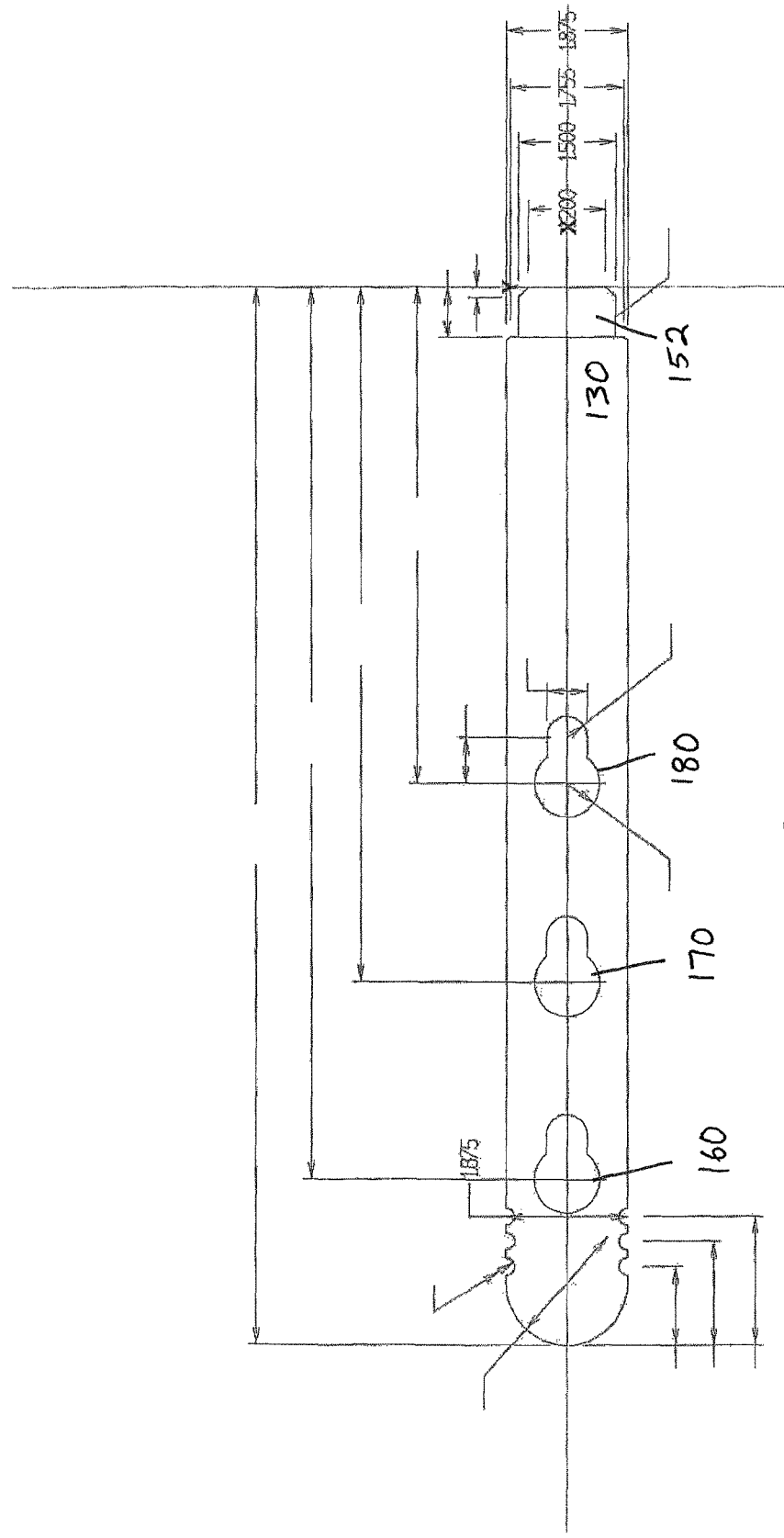
FIG. 26 is a side view of an example shaft.

FIGS. 25A-27 show a second embodiment of a deadlift device. FIG. 25A is a top view of an example base. FIG. 25B is a cross section view of the example base of FIG. 25A FIG. 26 is a side view of an example shaft. FIG. 27 is a side view of an example lift bar.

When performing the deadlift, whether it is sumo style, conventional style, or Romanian style is hard to perform with proper form. This lift can cause the user serious injury if not performed properly, but is difficult to properly perform due to all the steps needed to ensure the lift is done correctly. The embodiments described herein make it much easier to perform exercises with proper form.

The "Perfect Deadlift Bar" forces the user to keep the weight that is being lifting properly aligned with the human body, keeps the weight being lifted centered with the spine, and allows the lifter to lift the entire weight off the ground, or carry the device and weights, without pushing the weight away from the body. When the weight being lifted is pushed away from the body, that motion causes serious strain on the spine and back, resulting in serious injury. This bar eliminates all of that, thus resulting in a perfect lift every time the bar is used.

The deadlift device permits all lifters to perform the deadlift with proper form. The bar design also allows for resistance bands to fit in the desired slots, so both weights and/or resistance bands can be used. The beveled keyhole slots permit insertion of one or more resistance bands at each desired location, and both bands and a lift bar can be inserted into the same hole on the shaft.

Base

In one example, the base is fabricated from Aluminum 60-61 material to provide a lightweight device with the capability to lift over 300 pounds. The base has a smooth finish on the bottom where a 1/16" recycled rubber with a permanent adhesive is placed as a floor protector. In this example, the bottom of the shaft screws into threading in the center of the base. Other shaft attachment methods may be used, including welding.

In other examples, the base may be made of regular carbon steel or other materials.

Main Shaft

In one example, the main shaft is fabricated from Aluminum 60-61 material, and has a diameter of 2 inches. The overall length is 14.5 inches. The top of the shaft has a flat smooth finish with a 1/10 radius in order to prevent the user from cutting a hand or other body part. The purpose of the flat finish with 1/10 radius is also to accommodate the handle attachment. The bottom of the shaft will also have threading, to screw into the base. When screwed all the way on, the last thread will overlap the bottom of the base to serve as a locking mechanism. This will prevent the shaft from being pulled out of the base, and serves as an additional safety measure. This "overlapping thread lip" will not be seen by the user, as it will have the rubber pad covering it.

In one example, the main shaft has 3 holes, each with a keyway slot machined through the entire shaft. The hole has a 1 inch diameter permit a 1 inch diameter handle to slide through. The bottom of the hole tapers to a ½" in length and ¾" in width keyway slot.

The keyway slot has a 1/10 radius (termed a "bevel" in this specification. The purpose of the keyway slot is to also allow for resistance bands to slide perfectly through the shaft. The bands can be used in place of weights, or in conjunction with weights. The bands will also serve as a great teaching tool for people who have never lifted before.

In other examples, the base may be made of regular carbon steel or other materials.

Lift Bar

In one example, the main shaft is fabricated from Aluminum 60-61 material with an overall length of 12 inches and a 1 inch diameter. The ends of the handle are flat with a smooth finish, and a 1/10 radius. The lift bar has a course ping finish to provide a comfortable grip.

Two holes will be drilled all the way through the lift bar, and will have 2 pins pressed through. The purpose of the pins are to hold the lift bar in place, while in use. The pins will prevent the handle from sliding out in either direction.

Handle

In one example, the handle is fabricated from Aluminum 60-61 material. The handle attachment is machined in 2 sections. The first section is sleeve that will fit and slide on top of the main shaft. A 1 inch hole is drilled on each side of the sleeve. The holes on the sleeve line up with the top hole on the main shaft.

The hand grip will have a rounded square finish, or round circular finish. The hand grip portion will also have a coarse ping finish for grip, or machined grooves for finger placement. The top of the sleeve will have an indention to where the bottom of the hand grip can sit in. Then, it will be welded together to make one piece. This entire handle attachment may also be cast in one complete piece. A pin will be machined separately. This pin will slide all the way through the handle attachment and main shaft. It will have a hole drilled on the end where a locking pin can slide through and keep the pin from sliding out of the main shaft.

Rehab Benefits

Because the weight is centered in line with body, the weight is centered on the hip structure itself; and the outer extremities don't work as hard like they would with a standard long barbell. Due to the design of this device, the bio mechanics now allow for an individual with a bad back and bad knees to lift up the weight from the ground up, having the same effect with a standard barbell; but makes it pain free. By using the device t, an individual with injuries can still work the hips, the glutes, the back, the lower back, and the inner and external obliques; safely and effectively.

Other Advantages

The device is an effective tool for teaching proper form, as well as safety to those with limited lifting experience. It is hard to teach lifting methods from the ground up, and the deadlift device helps teach proper techniques.

Use of the deadlift device develops the posterior chain. The posterior chain is a group of muscles consisting predominantly of tendons and ligaments on the posterior of the body. Examples of these muscles include the biceps femoris, gluteus maximus, erector spinae muscle group, trapezius, and posterior deltoids.

The deadlift device serves as a progression and regression tool. It does not eliminate the barbell, but adding a progression tool leading up to the barbell; and regression tool from people that are injured and not able to use standard barbell.

The compact design takes up very little space, so it is good for group training settings and also field work.

The design of the lifting bar makes it a good tool for grip strength training. Single finger, double finger, and triple finger deadlifts can now be performed with the device; resulting in an effective, and safe workout.

The handle attachment allows for many variations of endurance training; resulting on less pounding and stress on my athletes knees and joints". The device allows for maximum heart rate workouts and is a good cardio tool.

The deadlift device design keeps the weight in line with the center of gravity, creating a safe and effective workout. The design of the lifting bar allows for any sized hands to fit properly, thus not resulting in narrowed hand placement, rolled shoulders, and upper back discomfort such as the kettle bell.

It is to be understood that the specific embodiments and examples described above are by way of illustration, and not limitation. Various modifications may be made by one of ordinary skill, and the scope of the invention is as defined in the appended claims.

What is claimed is:
1. A deadlift device comprising:
   a base;
   a vertically-oriented cylindrical shaft comprising:
      a bottom end portion connected to the base,
      a top end portion comprising a top edge,
      an external diameter, and
      a plurality of horizontal channels located between the top end portion and the bottom end portion, each horizontal channel comprising:
         a main horizontally-oriented cylindrical through hole having a diameter with a bottom portion, and
         a keyhole slot extending downwardly from the bottom portion, wherein the respective diameters of the plurality of horizontal channels are the same; and
   a removable elongated lift bar assembly comprising:
      an elongated lift bar comprising a first end and a second end, and
      a locking element configured to secure the elongated lift bar into the main horizontally-oriented cylindrical through hole of a selected horizontal channel on the vertically-oriented cylindrical shaft.
2. The deadlift device of claim 1 further comprising
   a removable handle attachable to a proximal end of the vertically-oriented cylindrical shaft, the removable handle comprising:
      a handle opening, and
      a handle attachment sleeve comprising:
         a shaft mounting recess configured to overlap the top end portion of the vertically-oriented cylindrical shaft, and
         a sleeve locking element.
3. The deadlift device of claim 2 wherein the handle opening further comprises a grip portion.
4. The deadlift device of claim 2 wherein the handle attachment sleeve further comprises a first side hole, and
   a second side hole.
5. The deadlift device of claim 2 wherein the sleeve locking element further comprises a sleeve locking pin.
6. The deadlift device of claim 1 wherein
   the main horizontally-oriented cylindrical through hole of each horizontal channel comprises a beveled edge; and
   the keyhole slot of each horizontal hole comprises a beveled edge.
7. The deadlift device of claim 1 wherein
   the elongated lift bar has a circular cross section with a diameter matched to the main horizontally-oriented cylindrical through hole diameters.
8. The deadlift device of claim 1 wherein the locking element of the removable elongated lift bar assembly comprises:
   a first shaft mounting pin hole on the elongated lift bar, and a first locking pin; and
   a second shaft mounting pin hole on the elongated lift bar spaced apart from the first shaft mounting pin hole by a distance greater than the vertically-oriented cylindrical shaft external diameter, and a second locking pin.
9. The deadlift device of claim 8 wherein
   the first pin is press fit into the first shaft mounting pin hole, or
   the first locking pin is a spring pin.
10. The deadlift device of claim 1 wherein
    the base further comprises a central recess with shaft attachment threads;
    the bottom end portion of the vertically-oriented cylindrical shaft comprises shaft threads; and
    the vertically-oriented cylindrical shaft is connected to the base with the shaft threads and the shaft attachment threads.
11. A deadlift system comprising:
    a deadlift device comprising:
       a base;
       a vertically-oriented cylindrical shaft comprising:
          a bottom end portion connected to the base, a top end portion comprising a top edge,
          an external diameter, and
          a plurality of horizontal channels located between the top end portion and the bottom end portion, each horizontal channel comprising:
             a top portion with a main horizontally-oriented cylindrical through hole having a diameter, and a keyhole slot extending downwardly from a bottom portion of the diameter; and
a removable elongated lift bar assembly comprising:
an elongated lift bar comprising a first end and a second end, and
a locking element configured to secure the elongated lift bar into the main horizontally-oriented cylindrical through hole of a selected horizontal channel on the vertically-oriented cylindrical shaft; and
a first resistance band.

12. The deadlift system of claim 11 further comprising:
a removable handle attachable to a proximal end of the vertically-oriented cylindrical shaft, the removable handle comprising:
a handle opening; and
a handle attachment sleeve comprising:
a shaft mounting recess configured to overlap the top end portion of the vertically-oriented cylindrical shaft, and
a sleeve locking element.

13. The deadlift system of claim 11 further comprising a plurality of weights, each weight comprising a central hole configured to slide the weight onto the vertically-oriented cylindrical shaft.

14. The deadlift system of claim 11 further comprising a set of resistance bands having a range of resistance.

15. A method of performing deadlift exercises with a resistance,
the method comprising:
providing a deadlift device comprising:
a base;
a vertically-oriented cylindrical shaft comprising:
a bottom end portion connected to the base,
a top end portion comprising a top edge,
an external diameter, and
a plurality of horizontal channels located between the top end portion and the bottom end portion, each horizontal channel comprising:
a top portion with a main horizontally-oriented cylindrical through hole having a diameter, and a keyhole slot extending downwardly from a bottom portion of the diameter, wherein the respective diameters of the plurality of horizontal channels are the same; and
a removable handle attachable to a proximal end of the vertically-oriented cylindrical shaft, the removable handle comprising:
a handle opening, and
a handle attachment sleeve comprising:
a shaft mounting recess configured to overlap the top end portion of the vertically-oriented cylindrical shaft,
a sleeve locking element; and
selecting the resistance; and
performing one or more exercises with the removable handle.

16. The method of claim 15 further comprising:
providing a removable elongated lift bar for the deadlift device;
inserting the elongated lift bar into a selected one of the plurality of horizontal channels; and
performing the one or more exercises with the elongated lift bar.

17. The method of claim 15 wherein selecting the resistance further comprises
placing one or more removable weights on the vertically-oriented cylindrical shaft.

18. The method of claim 15 wherein selecting the resistance further comprises:
selecting one of the plurality of horizontal channels on the vertically-oriented cylindrical shaft; and
routing a first resistance band through the selected one of the plurality of horizontal channels.

19. The method of claim 15 wherein selecting the resistance further comprises:
placing one or more removable weights on the vertically-oriented cylindrical shaft;
selecting one of the plurality of horizontal channels on the vertically-oriented cylindrical shaft; and
routing a first resistance band through the selected one of the plurality of horizontal channels.

20. The method of claim 18 further comprising
teaching proper deadlift exercise techniques by using the deadlift device with a resistance band rather than added weight.

* * * * *